United States Patent

[11] 3,602,426

[72] Inventor John J. Affel
 Canoga Park, Calif.
[21] Appl. No. 822,338
[22] Filed Feb. 5, 1969
 Division of Ser. No. 669,760, Sept. 22, 1967,
 Pat. No. 3,507,724
[45] Patented Aug. 31, 1971
[73] Assignee International Telephone and Telegraph
 Corporation

[54] NUMBER WHEEL FOR COUNTER OR THE LIKE
 11 Claims, 11 Drawing Figs.
[52] U.S. Cl. .................................................. 235/1 C,
 235/117 R
[51] Int. Cl. ....................................................... G06c 23/00
[50] Field of Search ............................................ 235/1.3,
 117, 96; 156/73, 292, 293; 24/150, 114.5; 85/37;
 264/23, 273; 74/230.1, 230.15

[56] References Cited
 UNITED STATES PATENTS
| 1,643,551 | 9/1927 | Friden .......................... | 235/1 |
| 2,279,337 | 4/1942 | Niemann ..................... | 235/1 |
| 2,334,465 | 11/1943 | Wood .......................... | 235/133 |
| 3,419,297 | 12/1968 | Diepenhorst et al. ....... | 287/189.36 |
| 3,448,464 | 6/1969 | Jonas ........................... | 2/336 |
| 3,509,614 | 5/1970 | Eldred ......................... | 29/159 |

Primary Examiner—Stephen J. Tomsky
Attorneys—C. Cornell Remsen, Jr., Rayson P. Morris, Percy P. Lantzy, Paul W. Hemminger and A. Donald Stolzy ABSTRACT: A number wheel for use in a counter or other like device and embodying a novel construction of a number wheel and operatively associated parts, including a unitary sandwich of the wheel integral with a primary wheel hub, a spring detent member, and a secondary hub, the latter rotatably mounting and confining a driver gear element, with a spring and pawl reset mechanism confined in a recess in the sandwich. Also involved is the method of fabricating such a number wheel by a series of mechanical steps including ultrasonic welding for uniting the wheel hubs in forming the sandwich.

PATENTED AUG 31 1971 3,602,426
SHEET 1 OF 2
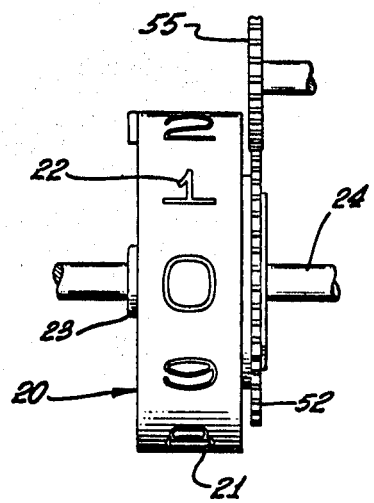
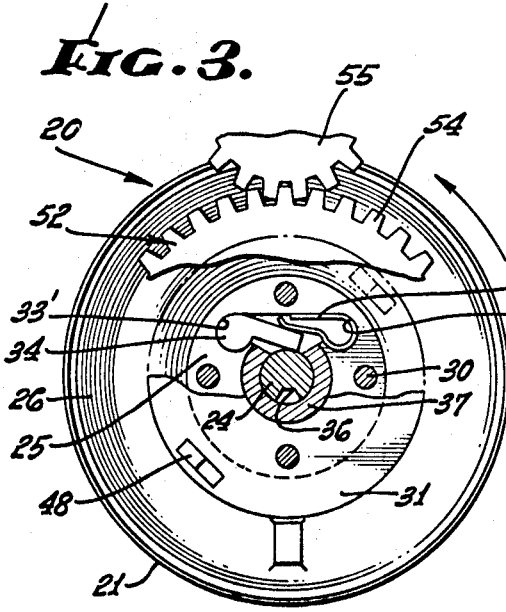
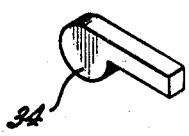
INVENTOR.
JOHN J. AFFEL
By A. Donald Stout
ATTORNEY.

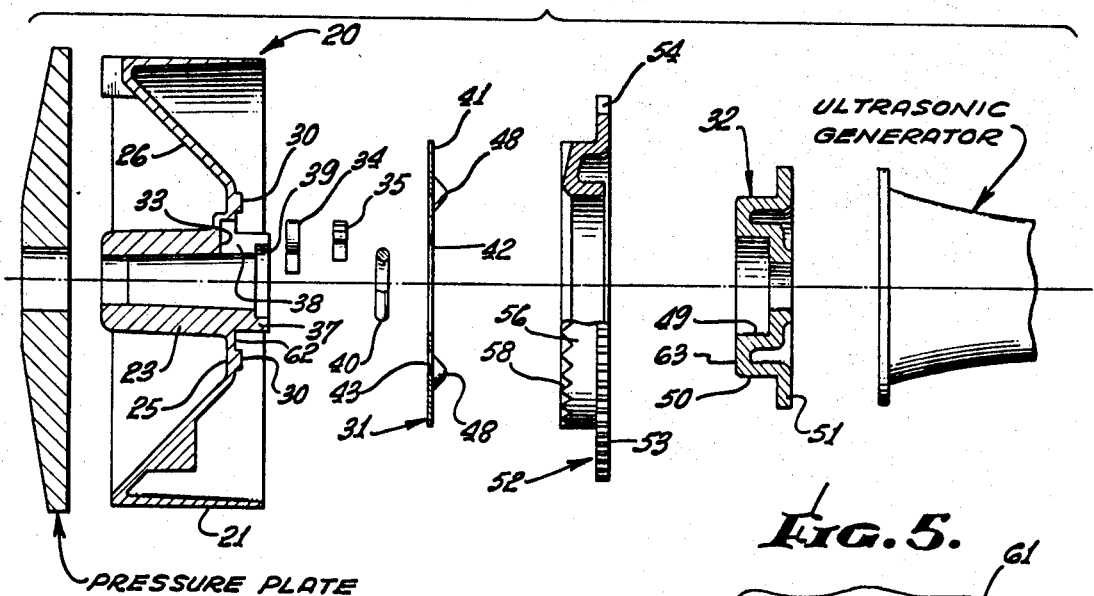
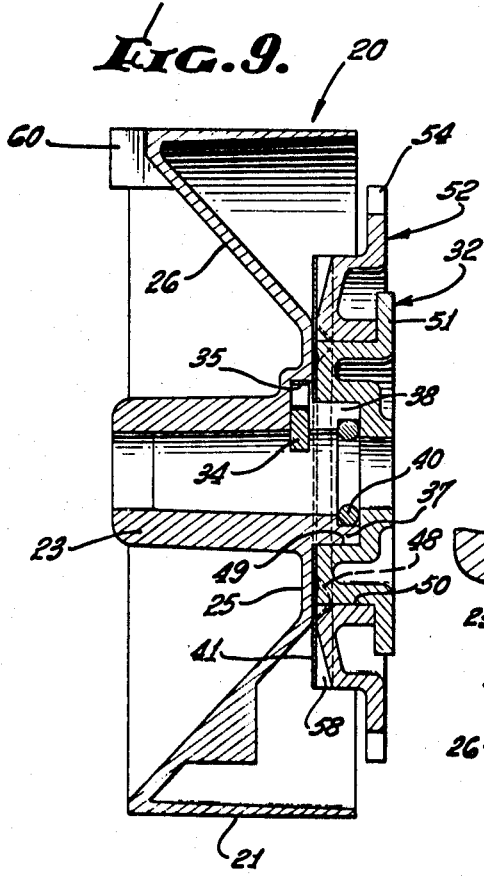
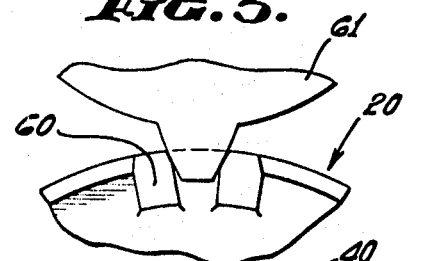
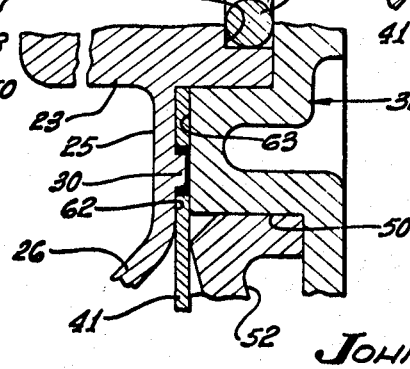
INVENTOR.
JOHN J. AFFEL ns
NUMBER WHEEL FOR COUNTER OR THE LIKE This application is a division of copending application, Ser. No. 669,760 filed on Sept. 22, 1967, for "Number Wheel for Counter or the Like and Method of Fabricating the Same." The said patent application has now issued into U.S. Pat. No. 3,507,724. The benefit of the filing date of said parent application is hereby claimed for this application.

BACKGROUND OF THE INVENTION

In counters and other devices of generally similar characteristics, it is customary to rotate a number wheel or the like by means of a cable, shaft, pawl escapement or other means. Thus, a mechanism turns the first wheel whereby distance or other measure is recorded in angular movement of the wheel. When more than one number wheels are employed, they are usually interrelated by Geneva elements whereby at the end of a revolution of the first number wheel, a second number wheel is rotated one step, and so on. In certain types of counters which can be reset to zero, the transmission between driver gear and wheel must be such that a slip-clutch action permits overriding rotation of the wheel without disconnecting the drive connection to the driver gear.

Number wheels are disclosed in the prior art but so far as applicant is aware they have been mechanical assemblies tedious and expensive to put together, somewhat excessive in weight, and lacking permanent simplified unification

SUMMARY OF THE INVENTION

The number wheel of the present invention is compact, lightweight, conveniently fabricated, and embodies a unique permanent sandwich-type assembly of wheel, driver gear and ratchet-type slip clutch.

The objective is accomplished by forming a wheel in generally cup shape of a material, preferably a plastic which is susceptible to welding by ultrasonic vibration. The wheel includes a hub from an end face of which one or more facets project, the hub including the facets being of the same material and integral with the wheel. A spring detent member is positioned against a web of the hub, being located by apertures through which the facets extend.

A secondary hub member made of the same material as the wheel, or any suitable material which can be ultrasonically welded thereto is utilized to rotatably mount the diver gear.

The driver gear is made of lightweight material, preferably a plastic, but of a character which will not weld to the hubs. It is retained on the secondary hub by a thrust flange integral with the hub.

The secondary hub, carrying the driver gear, is permanently attached to the primary hub. It is conveniently centered thereon by fitting over a stub extension of the primary hub. The preferred method of attachment is to subject the assembled parts to pressure and vibration by an ultrasonic generator, which will weld the two hubs into a unitary homogeneous and integral component.

The ratchet-type slip clutch comprises a surface on the driver gear formed with radially extending ratchet teeth, cooperatively engaging with the spring detent. The resilient engagement is adequate for the driver gear to turn the lightweight wheel, but will yield when the driver gear is restrained and the wheel is forcibly rotated for resetting the latter.

A spring-biased pawl is nested in a recess in the composite hub assembly, being held between adjacent surfaces of the primary hub and the spring detent member. The pawl rides freely in and out of a notch in a reset shaft when the driver gear is allowed to advance the wheel, but drops into the notch and is retained there when the shaft is rotated in the resetting direction.

The river gear may be rotated by any mechanical means such as gearing, ratcheting, etc. The wheel may have appended thereto a Geneva tooth for transfer of rotation in predetermined increments from one number wheel to an adjacent one.

BRIEF DESCRIPTION OF THE DRAWINGS

FIG. 1 is a front elevation of a number wheel made in accordance with the invention.

FIG. 2 is a similar view, enlarged and partly in section.

FIG. 3 is a vertical sectional view taken on the line 3—3 of FIG. 2.

FIG. 4 is a vertical sectional view taken on the line 4—4 of FIG. 2.

FIG. 5 is a fragmentary side view of a Geneva tooth transfer on the wheel.

FIG. 6 is a perspective of the pawl reset member.

FIG. 7 is a perspective of the spring which biases the pawl.

FIG. 8 is an exploded view partly in section of the parts which make up the number wheel, with a pressure plate and an ultrasonic generator indicated schematically.

FIG. 9 is a vertical sectional view of the parts of FIG. 8 as permanently assembled.

FIG. 10 is an enlarged fragmentary view showing parts assembled before welding.

FIG. 11 is a similar view after welding is completed.

DESCRIPTION OF THE PREFERRED EMBODIMENTS

The wheel 20 is generally cup shaped. The wall of the cup is in the form of a plane cylindrical wheel rim 21 on which any desired numbers 22 may appear, as for example 0 through 9, or more. The rim is made relatively thin compared to the wheel hub 23, which latter is mountable on a reset shaft 24. The inner end of the hub is enlarged into an annular web 25, and a frustoconical wheel disk 26 extends from the web into conjunction with the rim.

The wheel initially is provided on the end surface of the annular web 25 with a plurality of facets 30 which are used as locaters for a spring detent member 31 and as welding attachments for a secondary hub 32.

The annular web 25 is also formed with an elongated recess 33 which has open communication with the interior of the wheel hub. This recess is specially formed with enlarged circular ends 33' and 33''. A pawl 34 and a generally hairpin-shaped spring 35 are oppositely mounted in the recess, with the spring biasing the shank of the pawl against the shaft. Pawl and spring are each shaped with an enlarged end which fits into the ends 33' and 33'' respectively of the recess for maintaining the pawl and spring captive in the recess. The shaft has a notch 36 in vertical alignment with the pawl. When the wheel is rotated in a direction to advance the numbers (FIG. 3), the pawl rides over the shaft. When the shaft is rotated to reset the wheel, the pawl becomes engaged in the notch to transmit the rotation to reset the wheel (FIG. 4). The pawl and spring may be reversed in position, whereby the wheel is rendered bidirectional.

A generally annular stub extension 37 extends inwardly from the web 25 as a continuation of the hub 23. It is interrupted at 38 where the recess 33 communicates with the interior of the hub. At its outer end a bore 39 is formed to accommodate a ring 40 which axially positions the wheel on the shaft. Thus, in the event of high temperature or humidity, a set of wheels will not have a thermoexpansion which will cause them to contact one another. Misalignment of spur gears is also thereby prevented.

The detent member 31 is in the form of a thin disk 41 with spring characteristics. It has a central aperture 42 which fits over the extension 37, and it also has a plurality of smaller apertures 43 which can register with the welding facets 30. These facets extend through the apertures 43, and the latter preferably are of a diameter greater than that of the facets for reception of flowable material when welding takes place.

On the inner face of the disk 41 one or more detents (teeth) 48 may be provided. Conveniently, they may be struck from the material of the disk itself, and preferably there are two of them diametrically spaced to give proper balance.

Contiguous to the disk is positioned the secondary hub 32. It has a socket 49 which is engageable with the extension 37 to axially relate the parts. It is welded to the annular web 25 through the agency of the facets 30 in a manner to be later described. The secondary hub embodies a rim 50 terminating in a flange 51. The rim 50 provides an axle-type bearing for a driver gear 52, and the flange 51 functions as a thrust retainer of the gear, confining the latter between the disk 41 and the flange 51, the gear 52 being rotatable on the rim 50.

The gear 52 includes a relatively large-diameter section 53 with peripheral teeth 54 which can be engaged by any suitable driver, as for example by a spur gear 55 taking rotation from a source to be measured.

The driver gear also includes an annular axial offset 56 of relatively smaller outside diameter (corresponding generally to the outside diameter of the detent disk 41). The face of the annular offset is formed with radially extending ratchet teeth 58 for engagement by the detents 48.

When the gear 52 is driven, rotation is imparted to the detent disk through the ratchet teeth 58 resiliently engaged by the detents 48. By the rigid securement of the detent disk to the annular web 25 the wheel is rotated in a counting direction.

The wheel may be provided with Geneva teeth 60 engageable by any suitable Geneva element 61 for transferring rotation of the wheel to another wheel in series.

For resetting the wheel, the shaft 24 is manually rotated so as to bring the notch 36 into engagement with the pawl 34, and the latter transmits rotation to the hub assembly. The gear section 53 is restrained by the spur gear during reset. However, the resiliency of the detent member 31 permits the detents to ride over the ratchet teeth 58, and the wheel may be turned to zero or to any number desired.

The method of fabricating the wheel is an important phase of the invention. It avoids the use of screws, clamps, adhesives, and any other conventional assembly devices, which are cumbersome and difficult to employ, especially in miniature-size number wheels. Furthermore, it results in a unified assembly which will remain intact under all ordinary service conditions.

The wheel and the secondary hub are formed of ultrasonically weldable plastic, one example of which is nylon.

The detent spring disk and its teeth may be satisfactorily formed of any spring material.

The driver gear should not be ultrasonically weldable under the same conditions that the wheel and hub are weldable. A good material for that purpose is a tough plastic available as Du Pont "Delrin Acetal."

These named materials are by way of illustration and not of limitation.

In completing the assembly a fixture should be held on one side, as illustrated in FIG. 8, and an ultrasonic vibration should be applied to the other side. A suitable ultrasonic generator, which is known, produces vibrations at a frequency suitable to generate heat between the two surfaces so as to weld them. The vibrations are transmitted to the weldable parts through a horn- or rod-shaped structure, as schematically shown in FIG. 8.

The latter figure in the drawings illustrates the method referred to. It comprises the several steps of forming the wheel of an ultrasonically weldable plastic with a primary hub having an end surface 62 and including a facet of the same material integral with the hub and extending outwardly of the surface parallel to the hub axis, forming a secondary hub of the same material or material adaptable to the same type of welding, and with an annular bearing surface for a driver gear, and with an end surface 63 suitable for mating with the end surface of the primary hub. A spring detent member is formed with an aperture therein which will allow the facet to extend through. The detent member is placed against the end surface of the primary hub with the facet extending through the aperture. A driver gear is prepared of a material not receptive to ultrasonic welding and this is placed on the bearing surface of the secondary hub. A pawl and spring are disposed in a recess in the primary hub. The assembly of the gear and secondary hub is then placed in axial alignment with the primary hub with its end surface facing the end surface of the primary hub.

The assembly is placed in a holding fixture. This is preferably performed by disposing the block horizontal (90° from the position shown in FIG. 8) and stacking the parts thereon. A vibratory condition is then imparted to the hubs by an ultrasonic generator to weld the facet to the end surface of the primary hub, and thus forming a joint between the hubs resulting in a unitary hub assembly with the detent between the hub in a permanent structure. It is preferably also in forming the secondary hub to provide a flange to retain the driver gear on the secondary hub.

The vibration imparted by the ultrasonic generator affects only the contiguous material of the primary and secondary hubs. It appears that the facets of the primary hub become heated and flowable and not only fill the space in the aperture of the detent disk but flatten out and weldably merge with the contacting surface of the secondary hub, as seen in FIG. 11, so that when the welding is completed not only is the detent disk securely held in place but the primary and secondary hubs are completely unitary and for all practical purposes are homogeneous and integral. Furthermore, the pawl and spring are movably trapped in their recess, and the driver gear is captive for rotation on the rim of the secondary hub.

The wheel (primary) hub, the detent member, and the secondary hub are fixed rigidly together by the welding, so that there is no axial or radial play between these parts.

The counter wheel of the present invention may be either the units wheel, the tens wheel, or any other wheel. Further, the units wheel may be driven in step fashion or it may be driven continuously.

Although I have herein shown and described my invention in what I have conceived to be the most practical and preferred embodiment, it is recognized that departures may be made therefrom within the scope of my invention, which is not to be limited to the details disclosed herein but is to be accorded the full scope of the claims so as to embrace any and all equivalent devices and methods.

What is claimed is:

1. A number wheel for use as a component in a counter or other meter, and comprising: a wheel member with a numeral bearing peripheral rim, a primary hub, and rigid means interconnecting said rim and hub, a supplemental hub in axial alignment with the primary hub, said supplemental hub embodying an annular external bearing surface, a spring detent member interposed between the primary hub and supplemental hub, the two hubs being rigidly interconnected to comprise a unitary hub assembly with the detent member rigidly secured therein, and a driver gear rotatably mounted on said bearing surface, said driver gear being provided with an annular ratchet surface lying in a general plane normal to the axis of the hubs and in engagement with the detent member, said engagement affording sufficient frictional transmission force to transmit rotation of said driver gear to said wheel member to turn the latter when the hub assembly is free to rotate, but allowing slippage when sufficient force is applied to the hub assembly to rotate the same for resetting the wheel member.

2. A number wheel as defined in claim 1 in which a spring-biased pawl is mounted in the hub assembly with its tooth end protruding toward the axis of the hub and being adapted to ride over the surface of a reset shaft when the wheel member is being rotated in number advancing direction but engageable in a notch in the shaft when the shaft is rotated for resetting the wheel.

3. A number wheel as defined in claim 1 in which the spring detent member is formed with an aperture, and means extending through the aperture for interconnecting the primary and supplemental hubs.

4. A number wheel as defined in claim 3 in which said interconnecting means comprises a facet integral with and extending from one of the hubs and is welded to the other of the hubs.

5. A number wheel as defined in claim 4 in which the primary hub and the supplemental hub and the facets are formed of plastic material which can be joined by ultrasonic vibration and are welded together by such means.

6. A number wheel as defined in claim 2 in which a recess is formed in the primary hub, the pawl and its biasing spring are located in the recess, and are confined therein by the union of the primary and secondary hubs.

7. A number wheel as defined in claim 1 in which the detent member is a disk having spring characteristics, and detents are formed on the disk and protrude into engagement with the ratchet surface of the driver gear.

8. A number wheel as defined in claim 1 in which the supplemental hub is formed with a thrust flange at its outer end for retention of the driver gear on the supplemental hub.

9. A number wheel as defined in claim 1 in which the wheel member is generally cup shaped, the means interconnecting the rim and hub is a frustoconical web affording a housing space inside the lip of the cup, the driver gear is formed with a peripherally toothed section disposed outside the lip of the cup and with an offset extending into the housing space, the annular ratchet surface being formed on said offset.

10. A number wheel as defined in claim 4 in which the facet is formed on the primary hub.

11. A number wheel as defined in claim 1 wherein the primary and supplemental hubs are formed with mutually facing generally flat annular ends, the detent member is formed with an aperture in alignment with said ends, and a welded junction is formed between the two ends through said aperture.